Patented Mar. 5, 1946

2,396,145

UNITED STATES PATENT OFFICE 2,396,145

HETEROCYCLIC SULPHONAMIDO AZO COMPOUNDS

Eric Emil Anders Askelöf and Nanna Svartz, Stockholm, and Harry Carlo Willstaedt, Uppsala, Sweden, assignors to Aktiebolaget Pharmacia, Stockholm, Sweden, a registered company No Drawing. Application January 24, 1942, Serial No. 428,132. In Sweden December 14, 1940

4 Claims. (Cl. 260—156)

This invention relates to new azo compounds having bactericidal characteristics, and to a process of preparing the same.

It is known that aromatic amino compounds, containing either a sulphonic acid amide ("sulphamide" or "sulphonamide") group in the para position to the amino group, or two or more sulphonic acid amide groups in an arbitrary position, as a rule display bactericidal properties. Compounds of this kind in which one of the hydrogen atoms of the sulphamide group is substituted by a cyclic radical, or in which the two hydrogen atoms of the sulphamide group are substituted by alkyl groups also possess bactericidal properties. All of these compounds, however, suffer from the disadvantage that they are practically insoluble in water under neutral or slightly alkaline conditions.

Water-soluble products may be produced by diazotisation of above mentioned compounds and their coupling in the usual way with hydroxycarboxylic acids belonging to the aromatic, heterocyclic or aromatic-heterocyclic classes. But aromatic sulphonamide azo compounds having free acid groups have, however, been considered as being without bactericidal properties, unless the hydroxy acid has contained a basic, nucleo-bound nitrogen atom (cfr. e. g. U. S. patent specifications Nos. 2,085,037 and 2,113,597).

Quite surprisingly it has, however, now been discovered that azo compounds of the general formula:

R—N=N—Y—SO₂—NHX wherein R represents a benzene hydroxy carboxylic acid group free from nuclear-attached amino groups, Y represents an unsubstituted benzene group in which the sulphamide group is in para position to the azo group and X represents a substituent, selected from a class consisting of pyridyl, thiazolyl and methyl-substituted thiazolyl groups, in which nitrogen is nucleobound directly in the ring, said X being linked to the amido nitrogen by a carbon atom, not only possess very good bactericidal effects as compared with the above mentioned previously known sulphamide compounds, but also a wider therapeutic range. Substances comprised in this class have thus proven capable of successful appliance e. g. for the treatment of various kinds of rheumatic infections against which other sulphamide derivatives have shown no effect. These new substances thus are in the possession of a specific therapeutic effect.

In accordance with the above general formula, R consists of the group $R_1(OH)_n(COOH)_q$, in which $R_1$ represents a benzene group, which does not contain a nucleo-attached amino group or a directly in the ring nucleo-bound nitrogen atom:

$n$ stands for one up to the highest number of hydroxy groups which may be substituted in $R_1$; and $q$ stands for one up to the highest number of carboxylic groups which may be substituted in $R_1$.

The following formulas are typical examples of compounds constituted according to aforementioned principles.

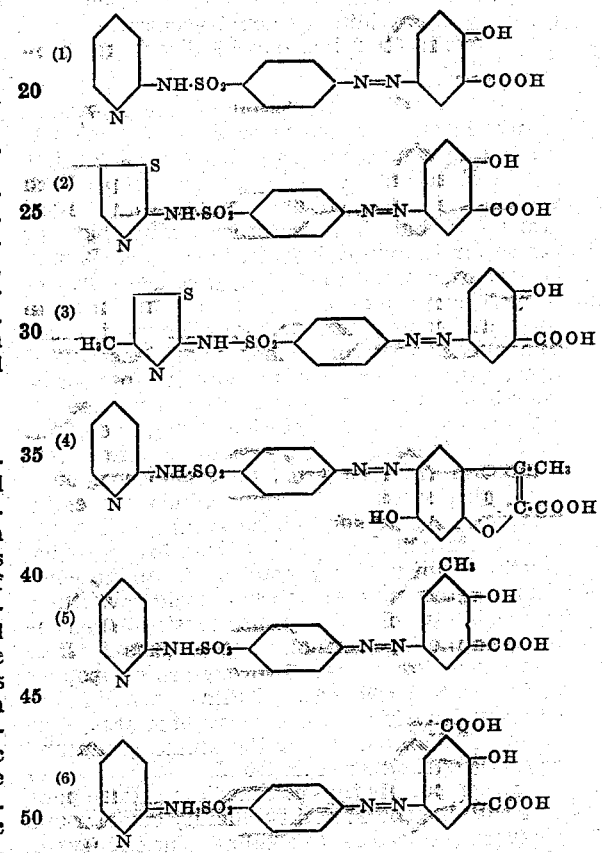

The above enumerated formulas, according to the nomenclature of Beilstein, "Handbuch der organischen Chemie," 4th ed., receive the following names:

(1) (2-aminopyridinesulphonyl)-benzene-<4-azo-5>-2-hydroxy-benzoic acid.
Brown-yellow substance, melting point about 240°–245° C.
Easily soluble in 2N NaOH with orange-red color.
Easily soluble in 2N $Na_2CO_3$ with orange-yellow color.
Slight solubility in concentrated acids.

(2) (2-aminothiazolsulphonyl)-benzene-<4-azo-5>-2-hydroxy-benzoic acid.
Orange-yellow substance, melts with decomposition at about 200° C. Easily soluble in 2N NaOH and 2N $Na_2CO_3$ with deep red color. Slight solubility in concentrated acids.

(3) (4-methyl-2-aminothiazolsulphonyl)-benzene-<4-azo-5>-2-hydroxy-benzoic acid.
Brown-yellow substance, melts with decomposition at about 220° C. Easily soluble in 2N NaOH (deep red) and 2N $Na_2CO_3$ (orange). Slight solubility in concentrated acids.

(4) (2-aminopyridinesulphonyl)-benzene-<4-azo-5>-6-hydroxy-3-methyl-2-cumaronic acid.

(5) (2-aminopyridinesulphonyl)-benzene-<4-azo-5->-3-methyl-2-hydroxy-benzoic acid.
Orange-yellow substance, melting point about 125° C.
Easily soluble in 2N NaOH with orange-red color.
Easily soluble in 2N $Na_2CO_3$ with orange color.
Slight solubility in concentrated acids.

(6) (2-aminopyridinesulphonyl)-benzene-<4-azo-5>-2-hydroxy-1,3-dicarboxy-benzene.

Regarding the preparation of the new substances in question, it has been found, that it is possible to employ not only the method consisting in diazotisation of the amino group of the sulphamide component and coupling with the hydroxy acid, but that also other methods known per se for the preparing of azo compounds may be employed to advantage, e. g. condensation of nitroso compounds with amino compounds to form azo compounds, or oxydation of hydrazo compounds to azo compounds, or condensation of hydroxylamino compounds with nitroso compounds to azoxy compounds and reduction to azo compounds. It is also possible, using one of the aforementioned methods, first to prepare an azo compound from an aromatic amino compound containing substituted groups which are easily transformed into sulphamide groups, and a hydroxycarboxylic acid not containing nitrogen whether in a nucleary bond or as amino compound, afterwards transforming said substituted groups into sulphamide groups substituted as denoted in the type formulas above. It is, further, also possible to prepare hydroxy-azo compounds of the aforementioned type using an amino-azo compound having suitable substituted groups, by means of diazotisation of the amino group and warming of the diazo compound.

The compounds thus obtained are colored powders with in general slight solubility in water and other usual solvents. In alkaline solution they will generally form more readily soluble salts having a stronger color. They melt or sinter under decomposition upon heating.

In the following some typical examples of preparing the new compounds are given.

*Example 1*

50 grams of α-(p-aminobenzene-sulphonamido-)pyridine are dissolved in a mixture of 50 ccs. of concentrated hydrochloric acid and 25 ccs. of water and diazotized with a solution of 13.8 grams sodium nitrite. In the meantime 28 grams of salicylic acid, 24 grams of potassium hydroxide and 12 grams of sodium carbonate are dissolved in water. The diazo suspension is added in portions to the alkaline solution of salicylic acid and the alkalinity maintained at a sufficiently high level during the whole reaction by means of addition of further quantities of potassium hydroxide solution. After 2 days the reaction mixture is heated for ½ hour at 50° C. After cooling the azo compound formed is precipitated by means of hydrochloric acid and filtered off. (The compound having the constitution numbered (1) above, may be prepared in this way.)

*Example 2*

50 grams of α-(p-aminobenzene sulphonamido)-pyridine is diazotized as in Example 1. The coupling is made with a mixture of 30 grams of ortho-cresotinic acid, 24 grams of potassium hydroxide and 12 grams of sodium carbonate in water. For the rest it is operated as stated in Example 1. (The compound having the constitution numbered (5) above, may be prepared in this way.)

*Example 3*

27 grams of p-aminobenzene sulphonamido-methyl-thiazole is suspended in a mixture of 25 ccs. concentrated hydrochloric acid and 50 ccs. of water and diazotized by means of a solution of 6.9 grams sodiumnitrite. In the meantime 14 grams of salicylic acid, 12 grams of potassium hydroxide and 6 grams of sodium carbonate in water. For the rest the coupling is carried out as stated in Example 1. (The compound having the constitution numbered (3) above, may be prepared in this manner. The compound numbered (2) may also be prepared in a similar way.)

*Example 4*

A solution of 17 grams of 5-nitroso-salicylic acid in 100 ccs. alcohol is added to a mixture of 25 grams α-(p-aminobenzene sulphonamido-)pyridine and 75 ccs. of glacial acetic acid. The reaction mixture is carefully warmed, whereby a homogeneous solution is first formed. The azo compound soon begins to crystallize and separate out. By addition of water the crystallization is promoted. The azo compound is filtered off, washed and dried. (The compound numbered (1) above may be prepared in this manner.)

*Example 5*

A solution of 5.3 grams of α-(p-nitrosobenzene-sulphonamido-)pyridine in 25 ccs. of alcohol is added to a solution of 3.8 grams amino-salicylic acid in 10 ccs. of glacial acetic acid. The mixture is heated for ½ hour on steam bath. After cooling 50 ccs. of water are added. The azo compound is suctioned off and treated as above. (The compound numbered (1) above may be prepared in this manner.)

*Example 6*

27.9 grams of α-(p-nitrobenzene sulphonamido-)pyridine is pulverized and suspended in 125 ccs. of water. If the mixture does not show a neutral reaction it is neutralized with sodium carbonate solution. 2 grams of ammonium chloride are added and the mixture is energetically stirred whereupon 15 grams of powdered zinc are gradually added in portions. The temperature of the solution is kept below 20° C. by means of adding lumps of ice to the same. After 30 minutes 17 grams of pulverized 5-nitroso-salicylic acid and after this 15 grams of a 30% solution of sodium hydroxide are added to the reaction mixture. The mixture is heated to 50° C. and is then allowed to cool and stand over night. The azoxy compound is now precipitated by means of hydrochloric acid, filtered, washed and dried.

33.7 grams of this azoxy compound are added to a solution of 22.6 grams of crystallized stannous chloride in concentrated hydrochloric acid. The azoxy compound is thereby reduced to the corresponding azo compound. After a few hours the mixture is diluted with water, the azo compound is filtered off, washed and dried. (The compound numbered (1) above may be prepared in this manner.)

*Example 7*

25 grams of α-(p-aminobenzene-sulfonamido-)pyridine are dissolved in a mixture of 25 ccs. of concentrated hydrochloric acid and 25 ccs. of water and diazotized by means of a solution of 6.9 grams of sodium nitrite. In the meantime 13.5 grams of anthranilic acid are dissolved in a mixture of 50 ccs. of water and 50 ccs. of glacial acetic acid. The diazo solution and the solution of anthranilic acid are now mixed and to the mixture are added 18 grams of crystallized sodium acetate. The stirring is continued and it is tested from time to time if the coupling has been completed and no free diazo compound is present. When this is the case the reaction mixture is mixed with 100 ccs. of glacial acetic acid and 60 ccs. of concentrated hydrochloric acid. The mixture is cooled and diazotized with a solution of 6.9 grams of sodium nitrite. The stirring is continued for 30 minutes after which the solution is heated on steam bath until the evolution of nitrogen has ceased, and then for another 30 minutes. The hydroxyazo compound may then be precipitated with water and is treated as above. (This procedure may be followed for preparing the compound constituted as shown under (1) above.)

*Example 8*

25 grams of α-(p-aminobenzene sulfonamido-)pyridine is diazotized as described in Example 1. The diazo compound is added to a solution of 19.2 grams of 6-hydroxy-methyl-cumarone-carboxylic acid, 12 grams of potassium hydroxide and 6 grams of sodium carbonate in water. After this the procedure is as according to Example 1. (In this manner the compound numbered (4) above may be prepared.)

*Example 9*

25 grams of α-(p-aminobenzene-sulphonamido-)pyridine is diazotized as in Example 1. The diazosuspension is added to a solution of 18 grams of 2-hydroxybenzene-1,3-dicarboxylic acid in 120 ccs. of 20% sodium hydroxide. The solution is filtered and allowed to stand over night after which the azo compound formed is precipitated with dilute hydrochloric acid. The compound numbered (6) above may be prepared in this manner.)

We claim:

1. Azo compounds having bactericidal properties and having the general formula:

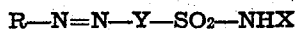

wherein R represents a benzene hydroxy-carboxylic acid group free from nuclear attached amino groups, Y represents an unsubstituted benzene group in which the sulfamide group is in para position to the azo group and X represents a substituent, selected from a class consisting of pyridiyl, thiazolyl and methyl-subsituted thiazolyl groups, in which nitrogen is nucleobound directly in the ring, said X being linked to the amido nitrogen by a carbon atom.

2. Azo compounds having bactericidal properties and having the general formula:

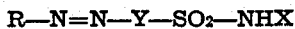

wherein R represents a benzene hydroxy-carboxylic acid group free from nuclear-attached amino groups, Y represents an unsubstituted benzene group in which the sulfamide group is in para position to the azo group and X represents a pyridyl group.

3. The azo compound of the formula:

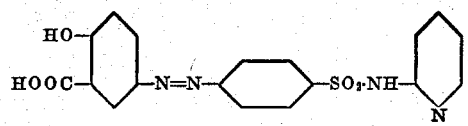

which compound forms water soluble salts with alkalies.

4. The azo compound of the formula:

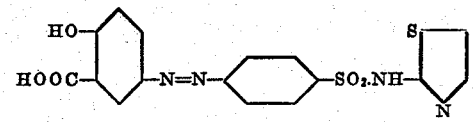

which compound forms water soluble salts with alkalies.

ERIC EMIL ANDERS ASKELÖF.
NANNA SVARTZ.
HARRY CARLO WILLSTAEDT.